United States Patent
Gilg et al.

(10) Patent No.: US 9,223,755 B2
(45) Date of Patent: Dec. 29, 2015

(54) APPARATUS AND METHOD FOR AUTOMATICALLY GENERATING A DETERMINISTRIC TARGET DIFFERENTIAL EQUATION SYSTEM

(75) Inventors: Albert Gilg, Kaufering (DE); Meinhard Paffrath, Feldkirchen (DE); Utz Wever, München (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 355 days.

(21) Appl. No.: 13/703,092

(22) PCT Filed: May 31, 2011

(86) PCT No.: PCT/EP2011/058909
§ 371 (c)(1),
(2), (4) Date: Jan. 21, 2013

(87) PCT Pub. No.: WO2011/154283
PCT Pub. Date: Dec. 15, 2011

(65) Prior Publication Data
US 2013/0132031 A1  May 23, 2013

(30) Foreign Application Priority Data

Jun. 10, 2010  (EP) ..................................... 10006029

(51) Int. Cl.
*G06F 17/18* (2006.01)
*G06F 17/13* (2006.01)
*G06F 11/34* (2006.01)
*G05B 23/02* (2006.01)
*G06F 17/11* (2006.01)

(52) U.S. Cl.
CPC ................ *G06F 17/18* (2013.01); *G06F 17/13* (2013.01); *G05B 23/0254* (2013.01); *G06F 11/3452* (2013.01); *G06F 17/11* (2013.01)

(58) Field of Classification Search
USPC ........................................................ 702/181
See application file for complete search history.

(56) References Cited

U.S. PATENT DOCUMENTS

2004/0030420 A1* 2/2004 Ulyanov et al. .................. 700/48
2004/0167753 A1* 8/2004 Downs et al. ...................... 703/2
2013/0132031 A1   5/2013 Gilg et al. ...................... 702/181

FOREIGN PATENT DOCUMENTS

WO  2011/154283 A1  12/2011  .............. G06F 17/13

OTHER PUBLICATIONS

International Search Report and Written Opinion, Application No. PCT/EP2011/058909, 24 pages, Jul. 11, 2011.

(Continued)

*Primary Examiner* — Paul D Lee
(74) *Attorney, Agent, or Firm* — Slayden Grubert Beard PLLC (57) ABSTRACT

An apparatus and method are provided for automatically generating a deterministic target differential equation system for evaluating an output differential equation system with stochastic input parameters with a device for providing a weighted sum of orthogonal basic functions inserted into the output differential equation system, which forms a stochastic random variable. A multiplication device for multiplying the output differential equation system by the orthogonal basic functions and an integration device for integrating the output differential equation system which is multiplied by the orthogonal basic functions to generate the deterministic target differential equation system are provided. A control device calculates stochastic output parameters based on the deterministic target differential equation system generated and accordingly controls a mechanical or electronic adjustment element. The apparatus may be suitable for use in a robust regulating and control circuit for regulating an installation, e.g., a chemical reaction installation, e.g., to minimize harmful exhaust gas substances.

13 Claims, 4 Drawing Sheets (56) References Cited

OTHER PUBLICATIONS

Augustin, F. et al., "A Survey in Mathematics for Industry—Polynomial Chaos for the Approximation of Uncertainties: Chances and Limits," European Journal of Applied Mathematics, vol. 19, No. 2, 42 pages, Jan. 18, 2008.

European Search Report, Application No. 10006029.2, 10 pages, Mar. 23, 2011.

\* cited by examiner

APPARATUS AND METHOD FOR AUTOMATICALLY GENERATING A DETERMINISTRIC TARGET DIFFERENTIAL EQUATION SYSTEM

CROSS-REFERENCE TO RELATED APPLICATIONS

This application is a U.S. National Stage Application of International Application No. PCT/EP2011/058909 filed May 31, 2011, which designates the United States of America, and claims priority to EP Patent Application No. 10006029.2 filed Jun. 10, 2010 The contents of which are hereby incorporated by reference in their entirety.

TECHNICAL FIELD

The disclosure relates to an apparatus and method for automatically generating a deterministic target differential equation system for the evaluation of an output differential equation system having stochastic input parameters (RDE: Random Differential Equation, in particular RODE: Random Ordinary Differential Equation, RPDE: Random Partial Differential Equation, RDDE: Random Delay Differential Equation), and in particular a robust regulating or control circuit comprising a control device which, depending on the generated deterministic target differential equation system, optimally adjusts stochastic input parameters of a technical system that is modeled by the output differential equation system.

BACKGROUND

Many technical processes and systems can be described by differential equations DGL. One or more differential equations can be used to model e.g. chemical processes (in particular combustion processes), many-body systems or transport systems. Many-body systems comprise e.g. automobiles, robots or machine tools. Differential equations can also be used to describe or model electrical circuits such as oscillators or digital circuits, for example. Further examples include transport processes and diffusion processes in the case of fluids and gases, or aging processes such as radioactive decay or population growth of e.g. microorganisms and the like.

Figure 1:
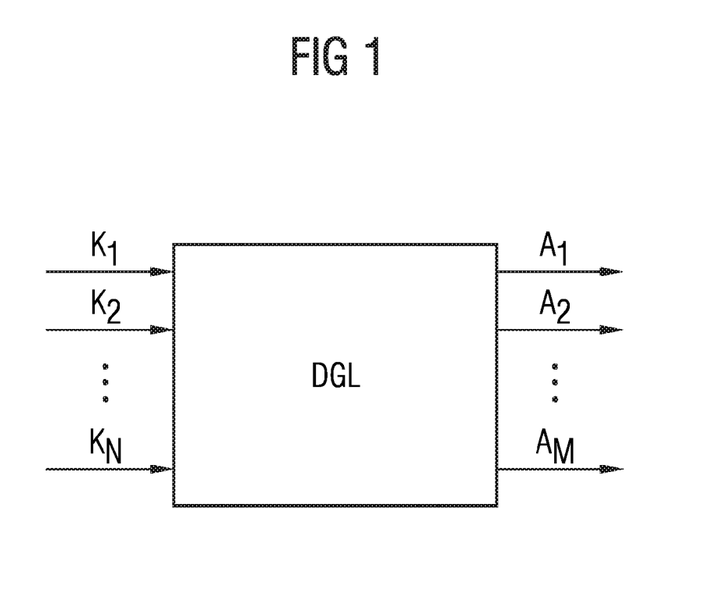
FIG. 1 shows a diagram to illustrate a technical problem underlying the disclosure.

FIG. 1 schematically shows a technical system to which input parameters K are applied, and which delivers output parameters A. The technical system is modeled or described by means of differential equations DGL. In many technical systems, the input parameters K are stochastic parameters or varying parameters. One example of varying input data or input parameters is the ambient temperature in the case of a chemical system for manufacturing or converting chemical products. Measured data that is delivered by e.g. measuring sensors can also have a stochastic distribution. In addition, e.g. the geometry of a many-body system can vary or deviate from a standard value due to manufacturing tolerances. In general, manufacturing tolerances of components that are present in a system constitute a possible source of variation of input parameters K. Deviations of the stochastic input parameters result in uncertainty in relation to the output parameters A of the system.

For example, a system can be a simulation model of a real technical system that is described by one or more differential equations. A typical example is a climatic model which is used to predict a future temperature profile T(t) for a future time period $\Delta T$ as a function of stochastic input parameters K. In the context of this simulation model, the future temperature profile T(t) represents an output parameter A(t), which is determined as a function of stochastic input parameters K. The stochastic input parameters K are e.g. the air pressures that are measured by one or more sensors at different locations. The measured stochastic input parameters K vary within a certain range, e.g. due to the manufacturing tolerances of the various sensors. The various uncertainties in relation to the various stochastic input parameters K proliferate in the calculation of the output parameter A(t), e.g. the predicted temperature profile T(t), such that a temperature prediction becomes more inaccurate as the calculated temperature value moves further into the future.

In the case of conventional simulation methods, such uncertainties (e.g. variation due to manufacturing tolerances) are taken into account using a so-called Monte Carlo evaluation. In this case, a random number set which reflects a probability distribution is generated, and the existing differential equation system is checked thoroughly using the corresponding generated values. This conventional method delivers the moments of the trajectory at the designated end time. This conventional approach results in considerable computing effort, particularly in the case of a complex technical system which has a complex differential equation system comprising a multiplicity of differential equations and a multiplicity of input parameters K. For example, in the case of such a conventional Monte Carlo evaluation of an output differential equation system, several months are required in some cases before the temporal profile of a specific output parameter $\Delta$ can be calculated. A microcomputer performing the calculation of an output parameter may require several thousand evaluations before a satisfactory convergence occurs.

Such a significant calculation effort and the associated lengthy calculation duration for the evaluation of an output differential equation system having stochastic input parameters prohibits any use in a corresponding control or regulation of the input parameters, particularly in the case of a technical installation in which input parameters must be adjusted in real time.

SUMMARY

In one embodiment, a method is provided for automatically evaluating a deterministic target differential equation system for a control device of a technical system which can be described by an output differential equation system having stochastic and non-stochastic input parameters, the method comprising: (a) determining a probability distribution of the stochastic input parameters based on measurements in a measuring device; (b) selecting a set of basic functions from a basic function memory depending on the type of probability distribution that has been determined; (c) deriving a mask vector which has expected values and standard deviations of the probability distribution that has been determined; (d) automatically calculating a weighted sum of the basic functions in a calculation unit, said sum being weighted using the mask vector; (e) automatically inserting the weighted sum of the orthogonal basic functions into the output differential equation system by means of the calculation unit in order to generate a deterministic target differential equation system; (f) integrating the deterministic target differential equation system in an integration device in order to calculate stochastic output parameters of the technical system; and (g) deterministically optimizing the calculated output parameters in the control device by automatically adjusting the stochastic input parameters to input parameter values that are associated with the optimal output parameters.

In a further embodiment, the calculated output parameters are evaluated in the control device in each case for the purpose of determining an expected value, a variance and a distribution density ρ of the respective output parameter. In a further embodiment, the output differential equation system is read out from a memory and comprises a plurality of differential equations including ordinary differential equations and partial differential equations. In a further embodiment, the basic functions are orthogonal relative to the distribution of the random variable. In a further embodiment, the probability distribution of the random variable is formed by a normal distribution, a beta distribution or a uniform distribution. In a further embodiment, a Hermitian basic function is selected as an orthogonal basic function in the case of a normal distribution of the random variable, a Jacobian basic function is selected as an orthogonal basic function in the case of a beta distribution of the random variable, and a Legendre basic function is selected as an orthogonal basic function in the case of a uniform distribution of the random variable.

In another embodiment, an apparatus is provided for automatically evaluating a deterministic target differential equation system of a technical system which can be described by means of an output differential equation system having stochastic and non-stochastic input parameters, the apparatus comprising: (a) a measuring device for determining a probability distribution of the stochastic input parameters; (b) a basic function memory, which is configured to store sets of orthogonal basic functions; (c) a device for selecting a set of basic functions from the basic function memory depending on the type of probability distribution that has been determined; (d) a calculation unit for deriving a mask vector which has expected values and standard deviations of the probability distribution that has been determined, for automatically calculating a weighted sum of the basic functions, said sum being weighted using the mask vector, and for automatically inserting the weighted sum of the orthogonal basic functions into the output differential equation system in order to generate a deterministic target differential equation system; (e) an integration device for integrating the deterministic target differential equation system in order to calculate stochastic output parameters of the technical system; and (f) a control device, which deterministically optimizes the calculated output parameters by automatically adjusting the stochastic input parameters to input parameter values that are associated with the optimal output parameters.

In another embodiment, a regulating or control circuit for a technical system comprises an apparatus as disclosed above, wherein the calculated output parameters are evaluated by the control device in each case for the purpose of determining an associated expected value of the output parameter, which is deterministically optimized in relation to the stochastic input parameters, and wherein at least one adjustment element of the technical system is driven by the control device in accordance with the optimized value of the respective input parameter.

BRIEF DESCRIPTION OF THE DRAWINGS

Example embodiments will be explained in more detail below with reference to figures, in which.

DETAILED DESCRIPTION

Some embodiments provide a method and an apparatus for automatically generating a deterministic target differential equation system in which the calculation effort and the associated calculation time is minimal, and wherein the generated deterministic target differential equation system can be used in a robust regulating or control circuit for the adjustment of input parameters.

For example, some embodiments provide a method for automatically generating a deterministic target differential equation system for evaluating an output differential equation system having stochastic input parameters, wherein the method comprises:

providing a weighted sum of orthogonal basic functions $\psi(\theta)$, which is inserted in the output differential equation system, where $(\theta)$ represents a stochastic random variable;

multiplying the output differential equation system by the orthogonal basic functions $\psi(\theta)$ provided;

integrating the output differential equation system that has been multiplied by the orthogonal basic functions $\psi(\theta)$, in order to generate the deterministic target differential equation system; and calculating stochastic output parameters based on the generated deterministic target differential equation system.

The method may be implemented by one or more microprocessors by executing a control program in real time.

In one embodiment of the method, the calculated stochastic output parameters are evaluated in each case for the purpose of determining an expected value, a variance and a distribution density of the respective stochastic output parameter.

In one embodiment of the method, the determined expected value of the respective stochastic output parameter is optimized deterministically in relation to the stochastic input parameters, and the input parameters are automatically adjusted according to the input parameter values that are associated with the optimal output parameter.

In one embodiment of the method, the output differential equation system is read out from a memory and comprises a plurality of differential equations featuring ordinary differential equations and partial differential equations.

In one embodiment of the method, the stochastic input parameters each have an associated probability distribution in relation to a stochastic random variable.

In one embodiment of the method, the probability distribution of a stochastic input parameter is determined based on measurements of the respective stochastic input parameter.

In one embodiment of the method, the orthogonal basic functions are orthogonal in relation to the distribution of the random variable.

In one embodiment of the method, the probability distribution of the random variable is formed by a normal distribution.

In a further embodiment of the method, the probability distribution of the random variable is formed by a beta distribution.

In a further embodiment of the method, the probability distribution is formed by a uniform distribution.

In one embodiment of the method, a Hermitian basic function is provided as an orthogonal basic function in the case of a normal distribution of the random variable.

In a further embodiment of the method, a Jacobian basic function is provided as an orthogonal basic function in the case of a beta distribution of the random variable.

In a further embodiment of the method, a Legendre basic function is provided as an orthogonal basic function in the case of a uniform distribution of the random variable.

In a possible embodiment of the method, the orthogonal basic function is selected depending on the determined probability distribution of the random variable.

In a possible embodiment of the method, the selected orthogonal basic function is read out from a basic function memory.

Other embodiments provide an apparatus for automatically generating a deterministic target differential equation system as per the features specified in claim 14.

For example, some embodiments provide an apparatus for automatically generating a deterministic target differential equation system for evaluating an output differential equation system having stochastic input parameters, comprising:
- a device for providing a weighted sum of orthogonal basic functions $\psi(\theta)$, which sum is inserted in the output differential equation system, where $(\theta)$ represents a stochastic random variable;
- a multiplication device for multiplying the output differential equation system by the orthogonal basic functions $\psi(\theta)$ provided;
- an integration device for integrating the output differential equation system that has been multiplied by the orthogonal basic functions $\psi(\theta)$, in order to generate the deterministic target differential equation system; and
- a control device which calculates stochastic output parameters based on the generated deterministic target differential equation system.

Other embodiments provide a robust regulating or control circuit comprising an apparatus for automatically generating a deterministic target differential equation system for evaluating an output differential equation system having stochastic input parameters, comprising:
- a device for providing a weighted sum of orthogonal basic functions $\psi(\theta)$, which sum is inserted in the output differential equation system, where $(\theta)$ represents a stochastic random variable;
- a multiplication device for multiplying the output differential equation system by the orthogonal basic functions $\psi(\theta)$ provided;
- an integration device for integrating the output differential equation system that has been multiplied by the orthogonal basic functions $\psi(\theta)$, in order to generate the deterministic target differential equation system; and
- a control device which calculates stochastic output parameters based on the generated deterministic target differential equation system.

In one embodiment of the regulating or control circuit, the calculated stochastic output parameters are evaluated by the control device in order to determine in each case an associated expected value of the output parameter, which is optimized deterministically in relation to the stochastic input parameter.

In one embodiment of the regulating or control circuit, an adjustment element is driven by the control device in accordance with the optimized value of the respective input parameter.

Figure 2:
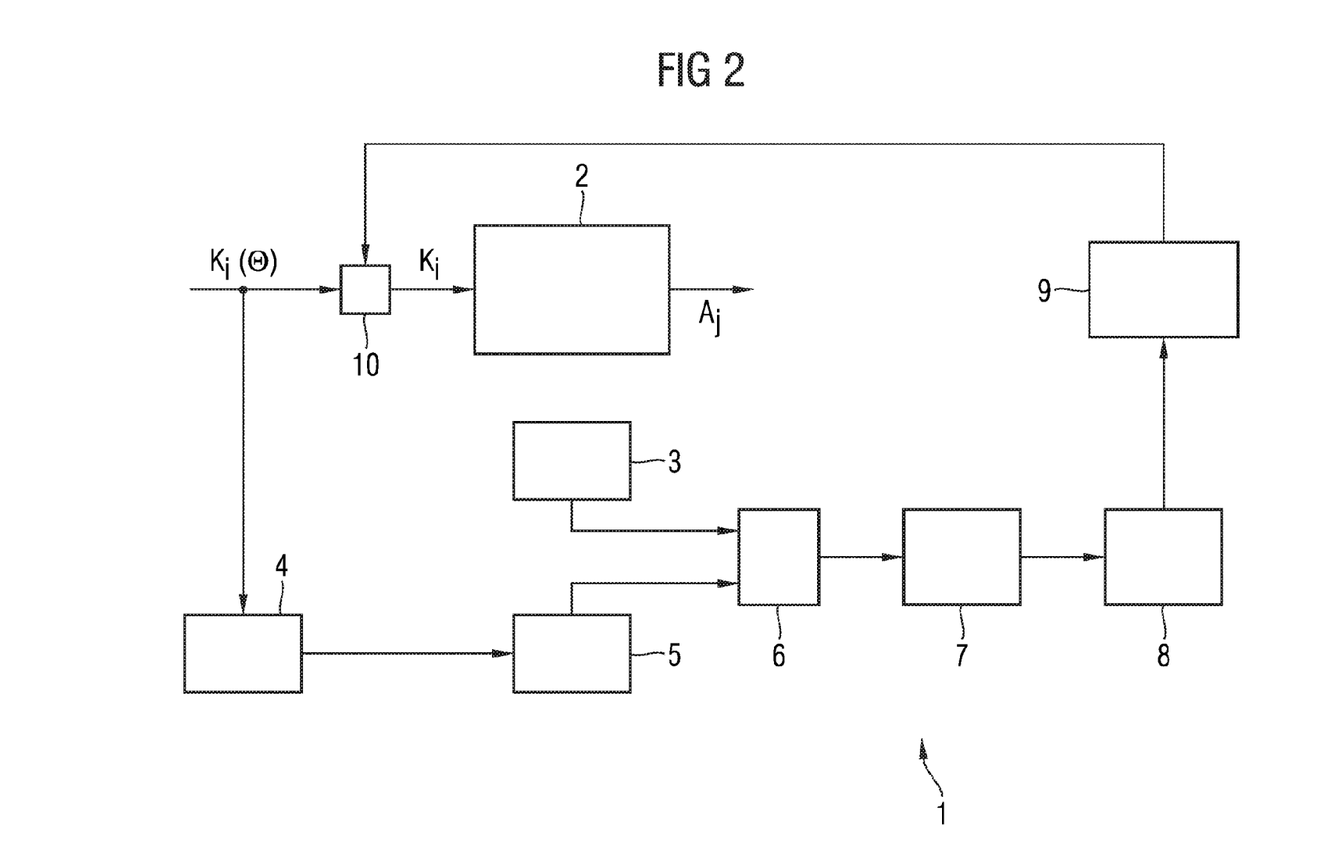
FIG. 2 shows a block schematic diagram to illustrate a possible embodiment of the disclosed apparatus for automatically generating a deterministic target differential equation system.

As shown in FIG. 2, an apparatus 1 according to one embodiment is used to provide a deterministic target differential equation system, by means of which a control device can influence and control or regulate a technical system.

The technical system 2 can have a plurality of input parameters $K_I$ and a plurality of output parameters $A_J$. The input parameters $K_I$ are stochastic input parameters which are characterized by variation.

The technical system 2 can be an installation for annihilating nitrogen monoxide NO, for example, where the concentration C of the nitrogen monoxide NO is decreased in a chemical reduction reaction. In this case, the course of the chemical reaction depends on the temperature T at which it takes place. In this exemplary embodiment, the combustion or reaction temperature T represents a stochastic input parameter K and the concentration $C_{NO}$ of the nitrogen monoxide NO that is released represents a stochastic output parameter $A_J$. The chemical reaction that takes place in a furnace of the installation 2 can be represented by an output differential equation system having stochastic input parameters K.

A further example of a technical system 2 is a many-body system such as a vehicle, a robot or a machine tool, for example. This many-body system is composed of a multiplicity of mechanical components, which are manufactured by different manufacturers and/or have different manufacturing tolerances.

The technical system 2 can also be an electrical circuit such as an oscillator circuit, for example, whose behavior must be simulated. This circuit is composed of components having model parameters that vary, e.g. electronic components having different manufacturing tolerances and uncertain measured data and/or input signals which vary stochastically.

The behavior of the technical system or technical installation 2 can be described by an output differential equation system comprising one or more differential equations. The output differential equation system can comprise various classes of differential equations. Moreover, the differential equations can be ordinary differential equations and/or partial differential equations. The output differential equation system therefore models a real technical system 2 (e.g. a chemical process) and is stored in a data memory 3. The various stochastic input parameters K of the respective technical system 2 each have an associated probability distribution $K(\theta)$ in relation to a stochastic random variable $\theta$.

In the embodiment illustrated in FIG. 2, the probability distribution of the stochastic input parameter K is determined based on measurements of the stochastic input parameter. For this purpose, the apparatus 1 has an associated measuring device 4 for the respective stochastic input parameter K, which determines the probability distribution $K(\theta)$ of the stochastic input parameter K by means of measurements. The probability distribution of the various stochastic input parameters K in relation to the stochastic random variable $(\theta)$ can differ and can comprise e.g. a normal distribution, a beta distribution or a uniform distribution. Depending on the type of probability distribution of the respective stochastic input parameter K, as determined by the measuring device 4, an associated suitable orthogonal basic function is selected from a basic function memory 5. The orthogonal basic function may therefore be selected automatically depending on the determined probability density distribution of the random variable. This selected orthogonal basic function is read out from the basic function memory 5.

If the determined probability distribution of the random variable $(\theta)$ of the respective stochastic input parameter K is a normal distribution, a so-called Hermitian basic function is read out from the memory 5 as an orthogonal basic function in a possible embodiment of the disclosed apparatus.

If the determined probability distribution of the random variable (θ) is a beta distribution of the random variable, a Jacobian basic function is selected or provided as an orthogonal basic function in a possible embodiment.

If the determined probability distribution of the random variable (θ) is a uniform distribution, a Legendre basic function is provided as an orthogonal basic function and read out from the memory 5.

In the case of the disclosed apparatus 1, a weighted sum of orthogonal basic functions ψ(θ) is inserted into the output differential equation system that is read out from the memory 3. This insertion is effected automatically by a calculation unit 6. Furthermore, the calculation unit 6 multiplies said read-out output differential equation system by the orthogonal basic functions that have been provided and are read out from the basic function memory 5. An integration device 7, which is connected behind the calculation unit 6, integrates the output differential equation system that has been multiplied by the orthogonal basic functions in order to generate the deterministic target differential equation system, which is buffered in a memory 8. A control device 9 has access to the buffer memory 8 and calculates stochastic output parameters $A_J$ of the technical system 2 based on the generated deterministic target differential equation system. In this case, the calculated stochastic output parameters are evaluated by the control device 9 in each case in order to determine an associated expected value μ of the output parameter $A_J$, wherein the output parameter is deterministically optimized in relation to the stochastic input parameters $K_i$. The control device 9 controls an adjustment element 10 in accordance with the optimized value of the respective input parameter via a control line. The adjustment element 10 can be a mechanical or electronic adjustment element, for example. The mechanical adjustment element can be a valve, for example. The electronic adjustment element 10 can be a switch such as a relay or transistor that can be activated, for example.

Figure 3:
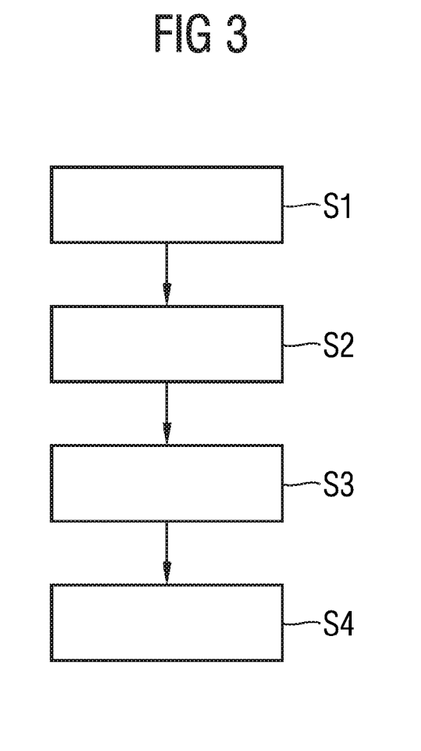
FIG. 3 shows a flow diagram to illustrate a possible exemplary embodiment of the disclosed method for automatically generating a deterministic target differential equation system.

FIG. 3 shows a simple flow diagram to illustrate an exemplary embodiment of the disclosed method.

In a step S1, a weighted sum of orthogonal basic functions ψ(θ) is provided first by readout of the basic function memory 5, wherein the calculation unit 6 automatically inserts said provided weighted sum of orthogonal basic functions into the output differential equation system that is read out from the data memory 3.

In a step S2, the output differential equation system is then multiplied by the orthogonal basic functions ψ(θ) provided.

In a further step S3, the output differential equation system that has been multiplied by the orthogonal basic functions is integrated in order to generate a deterministic target differential equation system. This is done in real time by the integration device 7, for example.

In a step S4, a calculation of stochastic output parameters is then performed based on the generated deterministic target differential equation system. The generated deterministic target differential equation system is stored in the buffer memory 8 by the integration device 7. The calculation of the stochastic execution parameters based on the buffered deterministic target differential equation system is done by the control device 9, for example. The stochastic output parameters may be evaluated for the purpose of determining an expected value μ, a variance σ and a distribution density ρ of the respective stochastic output parameter.

In one embodiment of the method, provision is made in a further step for the determined expected value μ of the respective stochastic output parameter $A_J$ to be deterministically optimized in relation to the stochastic input parameters K. The respective input parameters are then adjusted automatically by the control device 9 in accordance with the input parameter values associated with the optimal output parameters. In one embodiment of the method, the stochastic input parameters K have in each case an associated probability distribution K(θ) in relation to a stochastic random variable (θ), wherein the probability distribution of the stochastic input parameters K is determined in each case based on measurements of the respective stochastic input parameter, e.g. by means of a measuring device 4. Depending on the determined probability density distribution K(θ), the orthogonal basic function is selected and read out from the basic function memory 5 and made available or supplied to the calculation unit 6.

The approach of the disclosed method for automatically generating a deterministic target differential equation system can be illustrated based on a simple example as follows. In the simple example, the technical system 2 is described by a differential equation:

$$\dot{u}(t)=f(u(t),K), u(0)=U_0, K \in N(\mu,\sigma) \quad (1)$$

where K is a stochastic input parameter having a specific probability distribution depending on a random variable θ. The stochastic input parameter can be represented as distribution having an expected value μ and a variance σ:

$$K=\mu+\sigma\theta \quad (2).$$

The variable u can be developed as a PC series (PC: polynomial chaos) as follows:

$$u(t,\theta) = \sum_{i=0}^{n} u_i(t)\Psi_i(\theta) \quad (3)$$

where n represents the series length.

The developed series is inserted into the equation (1):

$$\sum_{i=0}^{n} \dot{u}_j(t)\Psi_i(\theta) = f\left(\sum_{j=0}^{n} u_j(t)\Psi_j(\theta), \mu + \sigma\theta\right). \quad (4)$$

By means of multiplying this output differential equation system by the orthogonal basic function ψ(θ) provided, and integration via the random variable θ within probability limits of the probability distribution, a deterministic target differential equation system is produced as follows:

$$\dot{u}_k^\circ(t) = \int f\left(\sum_{i=0}^{n} u_j(t)\Psi_j(\theta), \mu + \sigma\theta\right)\Psi_K(\theta)d\theta \quad (5)$$

where k=0, 1, 2, . . . , n,

ψ(θ) is an orthogonal basic function and

K is a stochastic input parameter which varies around a mean value or expected value μ having standard deviation σ.

The orthogonal basic functions ψ can be Hermitian basic functions, Jacobian basic functions or Legendre basic functions, for example. These basic functions may be selected automatically depending on a determined probability distribution of the random variable θ. The basic functions are orthogonal in relation to the density of the probability distribution that has been established or determined.

The output differential equation system of the technical system 2 can comprise a multiplicity of different differential equations DGL. In a simple exemplary embodiment, the technical system 2 can be described for example by two differential equations as follows:

$$x°(t) = ax(t) - bx(t)y(t) \tag{6}$$

$$y°(t) = bx(t)y(t) - cy(t) \tag{7}$$

where the parameters a, b, c can be stochastic input parameters K.

The technical system 2 has a plurality of input parameters K, wherein a plurality of input parameters K form an input parameter vector. A so-called dual mask vector DMV can also be derived. In the case of the simple example illustrated above, if the input parameter a and the third input parameter c are predetermined or not stochastic and the second input parameter b is a stochastic input parameter, a dual mask vector or dual mask vector matrix DMV is as follows:

$$DMV = \begin{pmatrix} a & o \\ \mu & \sigma \\ c & o \end{pmatrix} \tag{8}$$

From this, the calculation unit 6 automatically calculates a deterministic target differential equation system as follows:

$$\dot{x}_k(t) = \langle ax(t) - (\mu + \theta\sigma)x(t)y(t), \Psi_k(\theta) \rangle, \tag{9}$$
$$k = 0, 1, \ldots, n$$

$$\dot{y}_k(t) = \langle (\mu + \theta\sigma)x(t)y(t) - cy(t), \Psi_k(\theta) \rangle, \tag{10}$$
$$k = 0, 1, \ldots, n$$

$$\langle f(\theta), g(\theta) \rangle = \int_R f(\theta)g(\theta)e^{-\frac{\theta^2}{2}}d\theta. \tag{11}$$

This process is also known as projection.

In the case of the simple output differential equation system illustrated above, if the first two input parameters a, b are stochastic variables and the third input parameter c is a deterministic value, a dual mask vector DMV for example is produced as follows:

$$DMV = \begin{pmatrix} \mu_1 & \sigma_1 \\ \mu_2 & \sigma_2 \\ c & o \end{pmatrix} \tag{12}$$

From this, the calculation unit 6 automatically generates the following deterministic target differential equation system:

$$\dot{x}_k(t) = \langle (\mu_1 + \theta_1\sigma_1)x(t) - (\mu_2 + \theta_2\sigma_2)x(t)y(t), \Psi_k(\theta_1, \theta_2) \rangle, \tag{13}$$
$$k = 0, 1, \ldots, n$$

$$\dot{y}_k(t) = \langle (\mu_2 + \theta_2\sigma_2)x(t)y(t) - cy(t), \Psi_k(\theta_1, \theta_2) \rangle, \tag{14}$$
$$k = 0, 1, \ldots, n$$

$$\langle f(\theta_1, \theta_2), g(\theta_1, \theta_2) \rangle = \int_{R^2} f(\theta_1, \theta_2)g(\theta_1, \theta_2)e^{-\frac{(\theta_1^2 + \theta_2^2)}{2}}d\theta_1 d\theta_2. \tag{15}$$

Figure 4A:
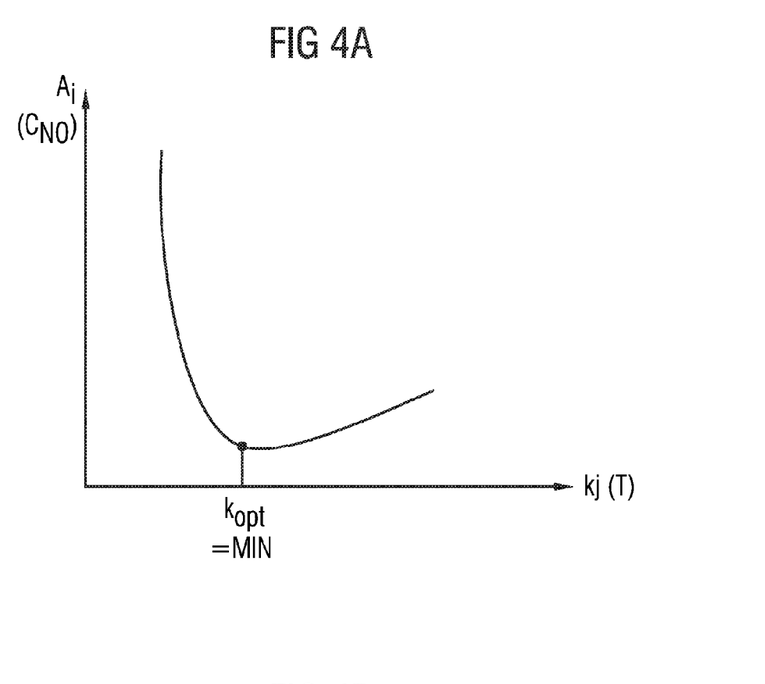
FIGS. 4A, 4B show diagrams to illustrate the way in which the disclosed regulating and control circuit functions in comparison with a conventional regulating and control circuit.
Figure 4B:
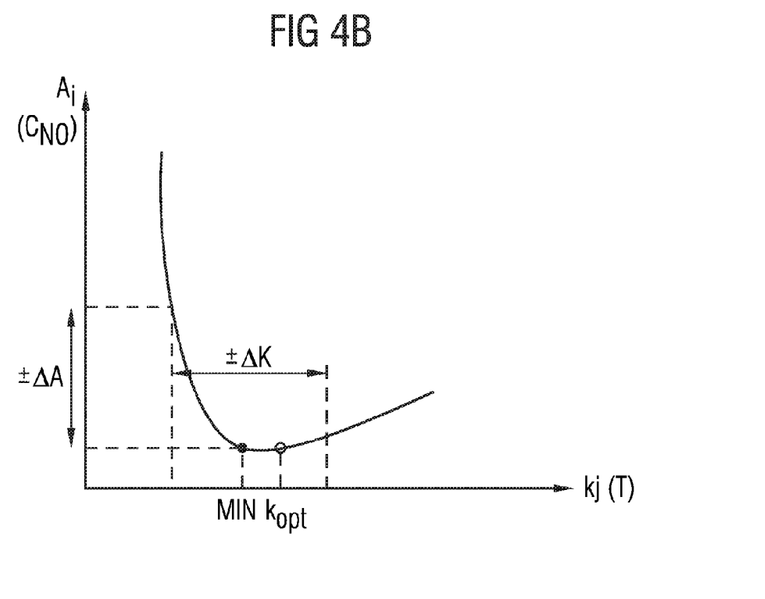

FIGS. 4A and 4B are used to illustrate the disclosed control or regulation using the generated deterministic target differential equation system. The technical system 2 can be e.g. an installation for processing chemical substances, e.g. a furnace for reducing a nitrogen monoxide concentration $C_{NO}$ of an exhaust gas. Using selective non-catalytic reduction (SNCR), it is possible to reduce a portion of nitrogen oxide emissions. The corresponding chemical reduction can be described as follows:

$$4NO + 4NH_3 + O_2 \rightarrow 4N_2 + 6H_2O \tag{16}$$

The chemical reaction involves NH2 radicals, which bind to the nitrogen monoxide NO and then decompose.

If the temperature is too low, the reaction rate is too low and there is no decrease in the nitrogen monoxide concentration. Conversely, if the reaction temperature is too high, the ammonia NH3 decomposes as follows:

$$4NH_3 + 5O_2 \rightarrow 4NO + 6H_2O \tag{17}$$

This means that the concentration C of the nitrogen monoxide NO is not reduced in the case of a temperature T that is too high, and on the contrary that nitrogen monoxide NO is even produced. The illustrated chemical process for reducing nitrogen monoxide NO is therefore limited to a narrow temperature window in which the process can operate efficiently. The temperature T of the environment in which the combustion process takes place represents a stochastic input variable, wherein the temperature T can fluctuate around an expected value.

FIGS. 4A and 4B show an exemplary characteristic curve, wherein the concentration $C_{NO}$ of the produced nitrogen monoxide NO depending on the ambient temperature t is shown as an output variable or an output parameter $A_J$ of the combustion furnace.

Using conventional control or regulation, the input variable or the input parameter in the illustrated example is adjusted according to an optimal value as shown in FIG. 4A. In the illustrated example, the optimal value is represented by the minimum of the illustrated curve, specifically the temperature at which the concentration C of the produced nitrogen monoxide NO is minimal. However, the furnace temperature T is actually a stochastic input variable that fluctuates or varies around an expected value. Therefore, if an adjustment element for the stochastic input variable T is adjusted to the minimal value of the illustrated curve in the normal way as illustrated in FIG. 4A, very significant fluctuations of the output variable $A_J$ (namely the nitrogen monoxide concentration $C_{NO}$) can arise due to the fluctuations of the stochastic input variable K and the steep profile of the characteristic curve below the minimum, as shown in FIG. 4A.

Taking into consideration the stochastic variation or fluctuations, the actual best value for the adjustment of the stochastic input parameter $K_J$ or T can therefore be above the local minimum of the characteristic curve, as shown in FIG. 4B.

In the illustrated example, the control and regulation does not therefore adjust the stochastic input parameter $K_J$ or the temperature of the furnace to the local minimal value of the curve, but to slightly above the minimal value, such that minimization of the nitrogen monoxide concentration $C_{NO}$ occurs when averaged over time. After specification of deterministic and/or stochastic input parameters K using a dual mask vector DMV and the deterministic equations, a deterministic target differential equation system is generated automatically and then worked out or solved using a numeric integration method, e.g., in real time.

What is claimed is:

1. A method for automatically decreasing production of nitrogen monoxide NO from a furnace of an installation, the method comprising:

a) determining a probability distribution of a temperature stochastic input parameter based on measurements of a temperature measuring device;
b) selecting a set of basic functions from a basic function memory depending on the determined probability distribution;
c) deriving a mask vector having expected values and standard deviations of the determined probability distribution;
d) a calculation unit automatically calculating a weighted sum of the basic functions, wherein the weighted sum is weighted using the mask vector;
e) the calculation unit automatically inserting the weighted sum of the basic functions into the output differential equation system to generate a deterministic target differential equation system;
f) an integration device integrating the deterministic target differential equation system to calculate a nitrogen monoxide concentration stochastic output parameter of the installation; and
g) a control device deterministically optimizing the calculated nitrogen monoxide concentration stochastic output parameter by automatically adjusting the temperature stochastic input parameter to an input parameter values associated with the optimal output parameter, whereby the concentration of the nitrogen monoxide is decreased in a chemical reaction.

2. The method of claim 1, wherein the control device evaluates the calculated output parameter to determine an expected value, a variance, and a distribution density $\rho$.

3. The method of claim 1, wherein the output differential equation system is read out from a memory and comprises a plurality of differential equations including ordinary differential equations and partial differential equations.

4. The method of claim 1, wherein the basic functions are orthogonal relative to the distribution of a random variable.

5. The method of claim 4, wherein the distribution of the random variable is formed by a normal distribution, a beta distribution, or a uniform distribution.

6. The method of claim 5, wherein a Hermitian basic function is selected as an orthogonal basic function in the case of a normal distribution of the random variable, a Jacobian basic function is selected as an orthogonal basic function in the case of a beta distribution of the random variable, and a Legendre basic function is selected as an orthogonal basic function in the case of a uniform distribution of the random variable.

7. An apparatus for automatically decreasing production of nitrogen monoxide NO from a furnace of an installation, the apparatus comprising:
a) a measuring device configured to determine a probability distribution of a temperature stochastic input parameter;
b) a basic function memory configured to store sets of orthogonal basic functions;
c) a device configured to select a set of basic functions from the basic function memory depending on the determined probability distribution;
d) a calculation unit configured to:
derive a mask vector having expected values and standard deviations of the determined probability distribution to automatically calculate a weighted sum of the basic functions, said weighted sum being weighted using the mask vector, and
to automatically insert the weighted sum of the orthogonal basic functions into the output differential equation system to generate a deterministic target differential equation system;
e) an integration device configured to integrate the deterministic target differential equation system to calculate a nitrogen monoxide concentration stochastic output parameter of the installation; and
f) a control device configured to deterministically optimize the calculated nitrogen monoxide concentration stochastic output parameter by automatically adjusting the temperature stochastic input parameter to input parameter values associated with the optimal output parameter, whereby the concentration of the nitrogen monoxide is decreased in a chemical reaction.

8. The apparatus of claim 7, wherein the control device is configured to evaluate the calculated output parameter to determine an expected value, a variance, and a distribution density $\rho$.

9. The apparatus of claim 7, wherein the output differential equation system comprises a plurality of differential equations including ordinary differential equations and partial differential equations.

10. The apparatus of claim 7, wherein the basic functions are orthogonal relative to the distribution of a random variable.

11. The apparatus of claim 10, wherein the distribution of the random variable is formed by a normal distribution, a beta distribution, or a uniform distribution.

12. The apparatus of claim 11, wherein a Hermitian basic function is selected as an orthogonal basic function in the case of a normal distribution of the random variable, a Jacobian basic function is selected as an orthogonal basic function in the case of a beta distribution of the random variable, and a Legendre basic function is selected as an orthogonal basic function in the case of a uniform distribution of the random variable.

13. A regulating or control circuit for a furnace of an installation comprising:
an apparatus for automatically evaluating a deterministic target differential equation system of a technical system that can be described by an output differential equation system having stochastic and non-stochastic input parameters, the apparatus comprising:
a measuring device configured to determine a probability distribution of a temperature stochastic input parameter;
a basic function memory configured to store sets of orthogonal basic functions;
a device configured to select a set of basic functions from the basic function memory depending on the determined probability distribution;
a calculation unit configured to:
derive a mask vector having expected values and standard deviations of the determined probability distribution to automatically calculate a weighted sum of the basic functions, said weighted sum being weighted using the mask vector, and
to automatically insert the weighted sum of the orthogonal basic functions into the output differential equation system to generate a deterministic target differential equation system;
an integration device configured to integrate the deterministic target differential equation system to calculate a nitrogen monoxide concentration stochastic output parameter of the installation; and
a control device configured to deterministically optimize the calculated nitrogen monoxide concentration stochastic output parameter by automatically adjusting the temperature stochastic input parameter to input parameter values associated with the optimal output parameter, whereby the concentration of the nitrogen monoxide is decreased in a chemical reaction.

* * * * *